United States Patent
Howell et al.

(10) Patent No.: US 6,354,971 B1
(45) Date of Patent: Mar. 12, 2002

(54) COMPLIANT DERAILLEUR

(75) Inventors: Larry L. Howell, Orem; Michael Sean Baker, Provo; Aaron Lyle Herring, Provo; Christian Dennis Lott, Provo, all of UT (US)

(73) Assignee: Brigham Young University, Provo, UT (US)

( * ) Notice: Subject to any disclaimer, the term of this patent is extended or adjusted under 35 U.S.C. 154(b) by 0 days.

(21) Appl. No.: 09/496,555

(22) Filed: Feb. 2, 2000

(51) Int. Cl.$^7$ ................................................ B62M 9/12
(52) U.S. Cl. ........................................................ 474/82
(58) Field of Search ...................... 474/82, 80

(56) References Cited

U.S. PATENT DOCUMENTS

| | | | |
|---|---|---|---|
| 4,106,356 A | | 8/1978 | Nagano et al. |
| 4,530,678 A | | 7/1985 | Wechsler |
| 4,637,809 A | | 1/1987 | Nagano |
| 4,699,605 A | * | 10/1987 | Jona ............................. 474/82 |
| 4,824,420 A | | 4/1989 | Romano |
| 4,878,395 A | | 11/1989 | Romano |
| 4,887,482 A | | 12/1989 | Romano |
| 5,425,678 A | * | 6/1995 | Richardson .................. 474/82 |
| 5,836,844 A | | 11/1998 | Yoshida |
| 5,897,451 A | * | 4/1999 | Ichida .......................... 474/82 |

* cited by examiner

Primary Examiner—Charles A Marmor
Assistant Examiner—Ankur Parekh
(74) Attorney, Agent, or Firm—Thorpe North & Western

(57) ABSTRACT

A derailleur, and more particularly, to a bicycle derailleur device that is compliant and self returning. There is a derailleur for moving a chain from one location to another while maintaining parallel alignment to a set of gears that mounted to a cycle. Specifically, the derailleur has a first and second rigid segments, parallel to each other, where the first segment means is fixed to the cycle and the second segment means is free to traverse from a first to a second position. In addition there is a first linking means, coupled between the first and second segments, for linking the first and second rigid segments together, and designed to move from the first position to the second position. Moreover, there is a second linking means, coupled between the first and second segments and spaced from the first linking means in about a parallel position, for linking the first and second rigid segments together, and designed for resiliently biasing the derailleur into the first position and for resiliently bending into the second position. Wherein the first linking means being shorter than the second linking means. Additionally, there is a chain wheel, coupled to the second segment, having a first axis that remains about parallel through all successive locations between the first and second positions. Uniquely, the first link (24) is rotatably coupled to the first and second rigid segments through a first and second pivot pins (26 and 28) respectively. Wherein the second link fully comprises a flexible material allowing the entire second link to bend into a shape approximating an "S" shape during movement between the first and second positions.

20 Claims, 2 Drawing Sheets

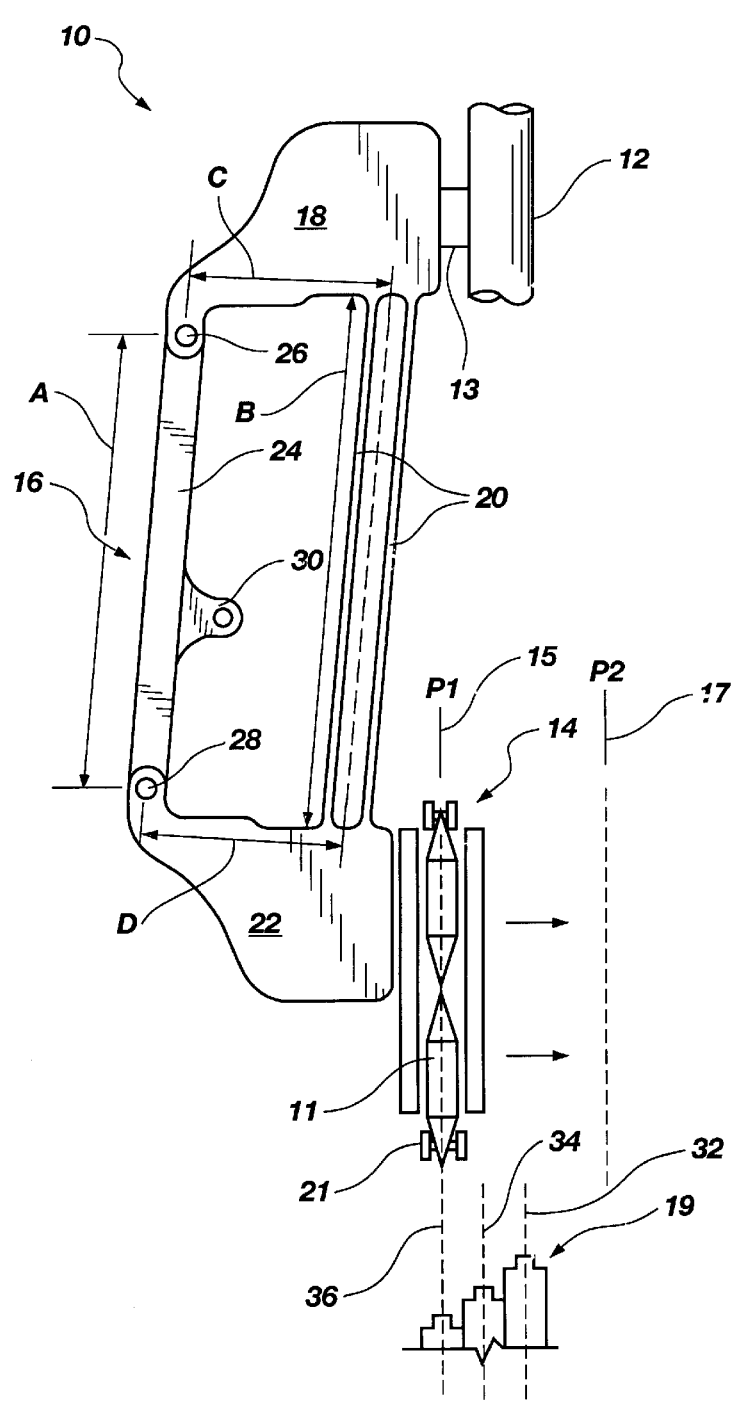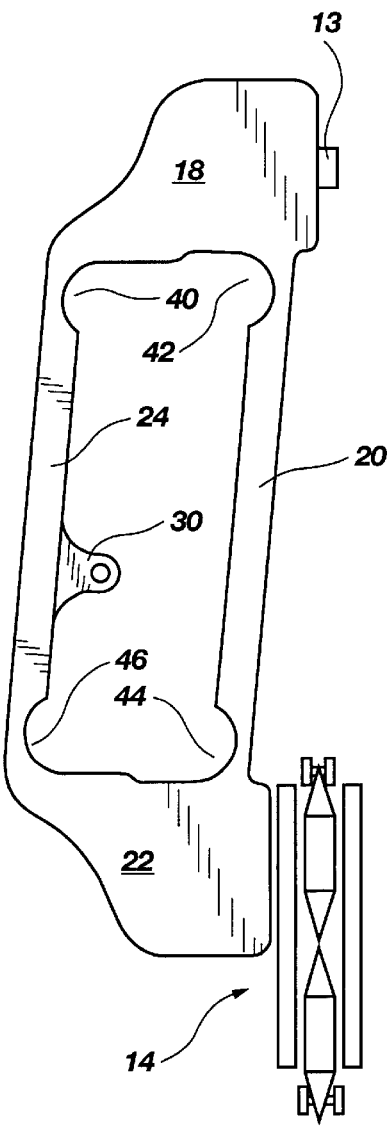
Fig. 1
Fig. 2

COMPLIANT DERAILLEUR

BACKGROUND OF THE INVENTION

1. Field of the Invention

The present invention relates to a derailleur, and more particularly, to a bicycle derailleur device that is compliant and self returning.

2. Prior Art

Because of the various meanings in English of the word "derailleur" it is considered necessary to clarify the manner in which this word is used in this specification. This particular word "derailleur" was apparently adopted into the English language from French in the mid 1800's to designate a mechanism for removing a wheel from a rail or for removing several wheels from a set or pair of rails. As time has progressed, this term "derailleur" has been used in English to designate a mechanism for shifting a flexible belt, chain or the like from a first gear or similar member to an adjacent coaxial gear or similar member. The word "derailleur" is also utilized to designate the precise structure within such a mechanism which engages and physically re-positions such a belt, chain or the like.

Derailleur mechanisms have been commonly employed for many years in connection with bicycles so as to allow the users of such bicycles to vary the particular mechanical advantage associated with the operation of these bicycles. Frequently this is expressed by indicating that a derailleur mechanism provides the user of a bicycle with a selection of different gear-ratios sufficient to facilitate the use of the bicycle. It is rather common to describe any bicycle provided with a derailleur mechanism for a purpose as indicated as a "derailleur" even though the bicycle itself will normally utilize two different derailleur mechanisms—one in association with the pedals of the bicycle and the other in association with the rear wheel of the bicycle.

The various prior derailleur mechanisms used in connection with bicycles have been constructed a number of different ways. Many of such mechanisms, have utilized two different, separate controls, one of which is associated with one of the derailleur mechanisms and the other of which is associated with the other of such mechanisms. When used, these two separate different mechanisms had to be manipulated in synchronism with one another so as to avoid any possible interference with the operation of the bicycle. A recognition of the problems associated with this had lead to the development of gear shift mechanisms in which two separate derailleur mechanisms or structures are concurrently operated through the use of a single control cable. This use of such a single control cable is highly desirable in that it effectively eliminates the need for coordination in shifting a derailleur type bicycle as was required with prior common place structures having two different controls for separately manipulating the two different shifter mechanisms on a bicycle.

In spite of the obvious advantages of derailleurs employing a single manipulative control as discussed in the preceding, it is believed that there is a need for improvement in the field of derailleur mechanisms and more specifically in the field of derailleur type bicycles equipped with several such mechanisms. Specifically it is considered that there has been a continuing need for derailleur mechanisms that are more economical than prior type derailleur mechanisms. Uniquely, if the derailleur mechanisms have fewer parts there would be great cost and natural resources savings. The reduced part count can result in an increased reliability because there are fewer parts to fail and compliant members are less sensitive to contaminates, such as dirt, than are pin joints. It may also result in a reduced component weight.

Examples of patents related to the present invention are as follows, and each patent is herein incorporated by reference for the supporting teachings:

U.S. Pat. No. 4,824,420, is a rear derailleur for bicycle gears.

U.S. Pat. No. 4,887,482, is a cable-guide element for the rear derailleur of a bicycle.

U.S. Pat. No. 4,878,395, is a device for operating the gear change of a bicycle.

U.S. Pat. No. 4,106,356, is a derailleur for a bicycle.

U.S. Pat. No. 5,836,844, is a rear derailleur for a bicycle.

U.S. Pat. No. 4,637,809, is a rear derailleur for a bicycle.

SUMMARY OF THE INVENTION

The primary objective of the present invention is to provide a derailleur, and more particularly, a bicycle derailleur device that is compliant and self returning.

There are possible advantages of the compliant derailleur over traditional derailleurs in addition to the cost savings mentioned. This includes a possible increased reliability due to fewer components to fail, fewer parts to have tolerance or assembly problems, and they are much less sensitive to contaminates, such as dirt. A reduction in weight may also be possible because of the decrease in the number of parts.

In accordance with one aspect of the invention, there is a derailleur for moving a chain from one location to another while maintaining parallel alignment to a set of gears mounted to a cycle. Specifically, the derailleur has a first and second rigid segment, parallel to each other, where the first segment is fixed to the cycle and the second segment is free to traverse from a first to a second position. In addition there is a first linking means, coupled between the first and second segments, for linking the first and second rigid segments together, and designed to move from the first position to the second position. Moreover, there is a second linking means, coupled between the first and second segments and spaced from the first linking means in about a parallel position, for linking the first and second rigid segments together, and designed for resiliently biasing the derailleur into the first position and for resiliently bending into the second position.

Wherein the invention further comprises a derailleur that has the first linking means being shorter than the second linking means. Additionally, there is a chain wheel, coupled to the second segment, having a first axis that remains about parallel through all successive locations between the first and second positions. Moreover, there is an attachment means for attaching the derailleur to a frame. Additionally, there is a chain, coupled about a portion of the chain wheel. Uniquely, the first link is rotatably coupled to the first and second rigid segments through a first and second pivot pin respectively. Wherein the first link fully comprises a flexible material allowing the entire first link to bend into a shape approximating an "S" shape during movement between the first and second positions.

DESCRIPTION OF THE DRAWINGS

FIG. 1 is a side perspective view of a derailleur device in accordance with the present invention.

FIG. 2 is a side perspective view of another embodiment of the invention.

Figure 3:
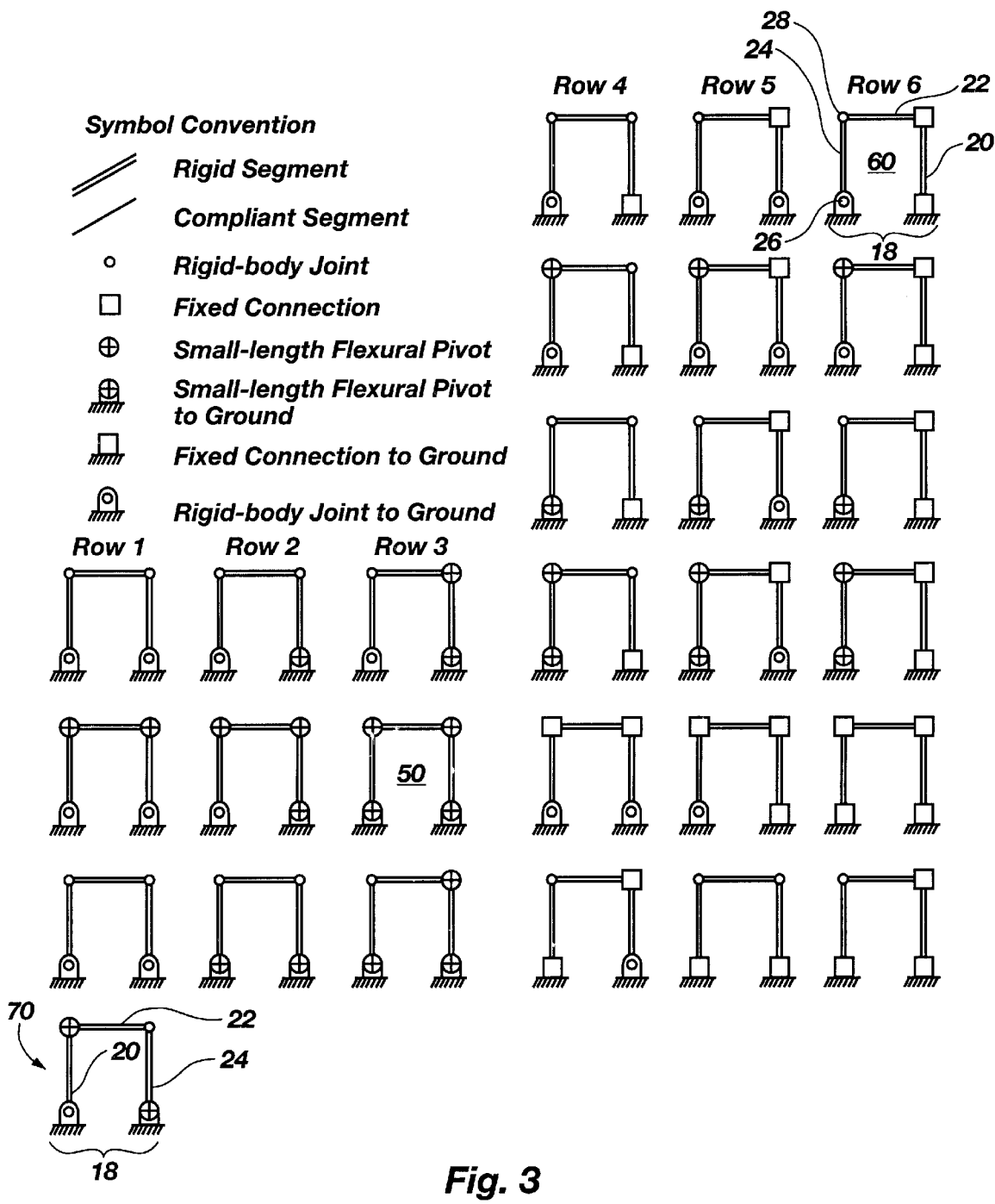
FIG. 3 is a chart of various embodiments of the invention.

It is noted that the drawings of the invention are not to scale. The drawings are merely schematic representations, not intended to portray specific parameters of the invention. The drawings are intended to depict only typical embodiments of the invention, and therefore should not be considered as limiting the scope of the invention. The invention will be described with additional specificity and detail through the use of the accompanying drawings. Like numbering between figures represents like elements.

DETAILED DESCRIPTION OF THE INVENTION

Referring to FIG. 1, there is a first preferred embodiment of the invention. Specifically, there is a derailleur 10, mounted to a bicycle on a portion of its frame 12. Specifically, the derailleur has an attachment means 13, which attaches the derailleur to the bike frame, a chain wheel 14, which holds a chain 21 to the derailleur as the chain rotates about the chain wheel 14. The chain wheel 14 has a toothed gear 11, that has a center line 15, which is aligned with an axis of individual sprocket or gears 19. The chain wheel is positioned proximate sprocket or gears 19. Derailleur 10 has a compliant parallel mechanism 16, which includes two opposite rigid segments 18 and 22 that are coupled together by a pivotal link 24 and a compliant link 20. Pivotal link 24 is rotatably coupled to the two rigid segments through pivot pins 26 and 28, and has a cable coupler 30 mounted thereon. The cable coupler is connected to a cable (not shown) that is controlled by the user to move the derailleur from center line 15 through all positions to center line 17, thus positioning the chain over different sized gears 19.

It is noted that the derailleur may start at a first position P1 and move toward position P2. Uniquely, axis 15 remains relatively parallel through its successive positions toward position P2, and will be coextensive with axis position 17, which would be aligned over a different one of gears 19 than in the P1 position. This parallel motion of axis 15 keeps wheel 14 in a uniformly aligned position relative to the sprocket to ensure that chain 21 will be coextensive with the several axis 32, 34 and 36 of gears 19. Additionally, it is noted that flexible member 20 will bend into a shape approximating an "S" shape during successive positions.

It is noted that flexible link 20 is disclosed as being fixedly mounted to segments 18 and 22. Therefore, member 20 functions as a biasing device that also restores the whole derailleur to an original position at axis location 15. Although a skilled artisans will realize that the original position of the derailleur can be in any position depending upon the setting of the other parts. One skilled in the art will realize the advantage of not having to add a spring to return the derailleur mechanism to its original position. Namely, there will be is fewer parts, and lower costs for making the derailleur mechanism. It may also be more reliable because the compliant members are less sensitive to contamination, require less maintenance, and have lower weight.

Uniquely, there is a best mode for the four dimensions forming the four sides of the derailleur generally illustrated in FIG. 1 by way of the lengths labeled as "A, B, C, and D". Specifically, dimensions "C" and "D" should be relatively equal, where "C" extends from the center of pivot point 26 and to the center line of flexible member 20, and "D" extends from the center of pivot point 28 and the centerline of flexible member 20. Moreover, dimension "A" should be approximately equal to 0.85 of dimension "B", where "A" extends between the centers of pivots 26 and 28, and "B" extends from the ends of flexible member 20. Although it is well within the abilities of a skilled artisan to vary these dimensions to a large degree, the optimum operation will follow these relationships. In other words, segment B is approximately 15% larger than segment A.

Referring to FIG. 2, there is illustrated an alternative embodiment of the invention. Specifically, there is illustrated a derailleur 10 having four small length flexural pivot 40, 42, 44 and 46. The four small length flexural pivots resiliently bend, allowing links 24 and 20 to move to different positions while maintaining wheel 14 in axial alignment with gears 19. Additionally, it is noted that flexural pivots, 40, 42, 44, and 46, act as springs to return the derailleur to a natural low tension position because of the flexural pivots resiliency.

Referring to FIG. 3, there is illustrated a chart of other various embodiments of the invention. Embodiment 70, found in row 1, fourth one down, illustrates the comparable positions of key features of the embodiment identified in FIG. 1, which are similarly situated in all of the embodiments depicted in this chart. Uniquely, the embodiment in row 3, second one down, labeled embodiment 50, represents the embodiment illustrated in FIG. 2. Additionally, the embodiment of FIG. 1, is illustrated by embodiment 60, found in row 6, first one down. One skilled in the art will understand the various embodiments that are possible to be designed based upon this chart. In each embodiment possible to function in the preferred manner herein described, there is at least one compliant or hinged portion capable of allowing bending or rotating of key sections to achieve parallel orientation of wheel 14 through successive positional changes.

Although the illustrated embodiment depicts compliant link 20 to be located closer to the bike 12 than link 24, it is contemplated to have these two parts switched in position. Also, link 20 is illustrated as two separate flexible members, wherein it is contemplated to have any number of flexible members, like one to four or more members. Additionally, as illustrated in FIG. 3, link 20 could also have joints or pivots at the point of attachment to members 18 and 22 and still function as disclosed in this invention. Also, although the preferred embodiment discusses applying the derailleur to a bicycle, it is contemplated to apply this invention to any device that may need a derailleur or a similar device with similar functions.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

What is claimed is:

1. A derailleur for moving a chain from one location to another while maintaining parallel alignment to a set of gears mounted to a cycle, comprising:

a) a first and second rigid segment, parallel to each other, where the first segment is fixed to the cycle and the second segment is free to traverse from a first to a second position;

b) first linking means, coupled between the first and second segments, for linking the first and second rigid segments together, and designed to move from the first position to the second positions; and c) second linking means, coupled between the first and second segments and spaced from the first linking means in about a parallel position, for linking the first and second rigid segments together, and designed for resiliently biasing the derailleur into the first position and for resiliently bending into the second position; and d) the first link being rotatably coupled to the first and second rigid segments through a first and second pivot pin respectively.

2. The derailleur of claim 1, wherein the first linking means is shorter than the second linking means.

3. The derailleur of claim 1, further comprising a chain wheel, coupled to the second segment, having a first axis that remains about parallel through all successive locations between the first and second positions.

4. The derailleur of claim 1, further comprising an attachment means for attaching the derailleur to a frame.

5. The derailleur of claim 1, further comprising a chain, coupled about a portion of the chain wheel.

6. The derailleur of claim 1, further comprising:

a) a cable coupler mounted to the first link; and b) cable means, coupled to the cable coupler, for moving the derailleur from the first position to the second position while maintaining the first axis in about a parallel position through all positions between the first and second positions.

7. The derailleur of claim 1, wherein the second link fully comprises a flexible material allowing the entire second link to bend into a shape approximating an "S" shape during movement between the first and second positions.

8. A derailleur for moving a chain from one location to another while maintaining parallel alignment to a set of gears mounted to a cycle, comprising:

a) a first and second rigid segment means, parallel to each other, where the first segment means is fixed to the cycle and the second segment means is free to traverse from a first to a second position;

b) first linking means, coupled between the first and second segments, for linking the first and second rigid segments together, and designed to move from the first position to the second positions; and c) second linking means, coupled between the first and second segments and spaced from the first linking means in about a parallel position, for linking the first and second rigid segments together, and designed for resiliently biasing the derailleur into the first position and for resiliently bending into the second position; and d) the second link fully comprising a flexible material allowing the entire second link to bend into a shape approximating an "S" shape during movement between the first and second positions.

9. The derailleur of claim 8, wherein the first linking means is shorter than the second linking means.

10. The derailleur of claim 8, further comprising a chain wheel, coupled to the second segment, having a first axis that remains about parallel through all successive locations between the first and second positions.

11. The derailleur of claim 8, further comprising an attachment means for attaching the derailleur to a frame.

12. The derailleur of claim 8, further comprising a chain, coupled about a portion of the chain wheel.

13. The derailleur of claim 8, wherein the first link is rotatably coupled to the first and second rigid segments through a first and second pivot pin respectively.

14. The derailleur of claim 8, further comprising:

a) a cable coupler mounted to the first link; and b) cable means, coupled to the cable coupler, for moving the derailleur from the first position to the second position while maintaining the first axis in about a parallel position through all positions between the first and second positions.

15. A derailleur for moving a chain from one location to another on a cycle, comprising:

a) first and second rigid segments, the first segment being configured to be fixed to the cycle, the second segment being free to traverse from a first to a second position;

b) a pivotal link, coupled between the first and second rigid segments, to link the first and second rigid segments together, and designed to move from the first position to the second positions; and c) a compliant link, coupled between the first and second rigid segments and spaced from the pivotal link in about a parallel position, to link the first and second rigid segments together; and d) the compliant link being flexible along an entire length thereof to resiliently bias the derailleur into the first position and to resiliently bend into the second position.

16. The derailleur of claim 15, wherein the pivotal link is rotatably coupled to the first and second rigid segments through first and second pivot pins respectively.

17. The derailleur of claim 15, wherein:

a) the pivotal link is pivotally coupled to the first and second rigid segments; and b) the compliant link is fixedly attached to the first and second rigid segments.

18. The derailleur of claim 15, wherein the compliant link is longer than the rigid link.

19. The derailleur of claim 15, wherein the compliant link is approximately 15% longer than the rigid link.

20. The derailleur of claim 15, further comprising:

a) a chain wheel, coupled to the second rigid segment, having a first axis;

b) the first axis remaining approximately parallel through all successive locations between the first and second positions; and c) the compliant link being longer than the rigid link.

* * * * *